United States Patent [19]

Catenacci

[11] 4,076,474

[45] Feb. 28, 1978

[54] SLIP FORM FOR CONCRETE

[76] Inventor: Gerald Anthony Catenacci, 44 Golfvalley Lane, Toronto, Ontario, Canada

[21] Appl. No.: 771,170

[22] Filed: Feb. 22, 1977

[51] Int. Cl.[2] .......................... B29F 3/00; B28B 13/02; E01C 19/48

[52] U.S. Cl. .......................................... 425/64; 425/84; 404/105

[58] Field of Search .............................. 425/64, 84, 63

[56] References Cited

U.S. PATENT DOCUMENTS

| | | | |
|---|---|---|---|
| 2,818,790 | 1/1958 | Canfield et al. | 425/64 X |
| 3,137,220 | 6/1964 | Smith | 425/64 X |
| 3,175,478 | 3/1965 | Smith | 425/64 X |
| 3,292,511 | 12/1966 | Cheney | 425/64 X |
| 3,578,740 | 5/1971 | Redding et al. | 425/84 |
| 3,600,773 | 8/1971 | Davis et al. | 425/63 |
| 3,685,405 | 8/1972 | McDonald et al. | 425/64 X |
| 3,915,584 | 10/1975 | Coho et al. | 425/64 X |
| 4,014,633 | 3/1977 | Gaughnoin | 425/64 X |

*Primary Examiner*—J. Howard Flint, Jr.

[57] ABSTRACT

Apparatus for slip forming concrete, having a form, and a hopper for receiving concrete and introducing the same into said form, and incorporating water extraction means, adapted to be positioned in the wet concrete, for extracting water therefrom thereby producing a more stable formed concrete mass, capable of standing on its own after the form has moved on.

8 Claims, 5 Drawing Figures

SLIP FORM FOR CONCRETE

The invention relates to a slip form for the forming of concrete, and is of particular interest in connection with the slip forming of concrete structures of greater than normal height in relation to their width.

Slip forming of concrete involves, in the majority of cases, the use of a continuously moving form, through which concrete is fed and deposited onto a substrate, usually the ground. Typically, structures which are formed by slip forming techniques will comprise highway road beds, highway curbs and the like. Such structures will usually exhibit a relatively low height in relation to their width.

Conceivably, slip forming of concrete can also be applied in reverse that is to say by establishing a fixed or static form, and providing a continuously moving conveyor belt, running underneath the form, for providing a continuous preformed concrete structure which can then be transported or positioned in any desired location. However, in the majority of cases the form itself is mounted on a movable vehicle or platform. Typically such movable vehicle or platform will incorporate means feeding the concrete to the slip form, and means for receiving concrete from a mobile source such as for example a ready-mix truck or the like.

One type of slip forming vehicle which is currently available on the market is manufactured by Huron Manufacturing of Huron, South Dakota, U.S.A. under the name EASI-POUR (Trade Mark).

Such a vehicle will incorporate means for adjusting the height of the slip form relative to the substrate, and control means for accurately controlling the direction of movement of the vehicle.

This type of slip forming machine usually employs what is known as "low-slump" concrete of a type which will retain its shape after it leaves the moving form. In many cases however the shape of the extruded structure will not be too difficult to retain after the concrete has left the form and for example, a structure such as a highway curb having a gutter and a ridge can be extruded relatively easily with this type of equipment. Usually, some form of vibrator means will be incorporated in the hopper receiving the concrete so as to ensure that the relatively thick consistency of the concrete will move satisfactorily through the hopper and into the form without producing voids or surface defects.

However, when it is attempted to employ such machinery for the forming of higher structures, difficulties are encountered. In particular, such structures which are somewhat higher than a concrete curb, and yet are relatively narrow in relation to their height, are found to be liable to collapse, or at least partially deform, after the concrete leaves the form. Clearly, this is because the concrete, while being of the low-slump variety, still does not have sufficient inherent stability to maintain the shape of the form without the support of the form around it, and does not in fact attain such a degree of stability until several hours after the forming of the concrete. An example of such a higher structure, is a highway median barrier of the type used between opposite lanes of a divided highway. Such median barriers are usually formed of precast concrete sections, or may be cast in place along the highway median. They incorporate a wider base portion, and a somewhat thinner upstanding central wall portion, and may extend up to a height of more or less three feet. In recent years such concrete median barriers have been found to be highly effective in restraining vehicles from crossing the median, when out of control. The curved shape of the side-walls of such median barriers in fact catches the off-side wheel of a vehicle out of control, and steers the front wheels back into the vehicle's own lane. The effectiveness of this type of median barrier makes it highly desirable to install such barriers along considerable lengths of highway. However, the cost of installing precast sections of such a barrier is very considerable and accordingly such a barrier had not found wide acceptance, in spite of its marked superiority over other forms of barrier.

By the use of the invention, it becomes possible to form structures such as highway median barriers by slip forming techniques thereby greatly reducing the cost.

BRIEF SUMMARY OF THE INVENTION

The invention seeks to provide apparatus for slip forming concrete, having a form, and a hopper for receiving concrete and introducing the same into said form, and incorporating water extraction means, adapted to be positioned in the wet concrete, for extracting water therefrom thereby producing a more stable formed concrete mass, capable of standing on its own after the form has moved on.

The invention may provide such an apparatus in which water extraction means are located within the hopper, spaced from the side-walls thereof locating the same within the mass of concrete when such hopper is filled with concrete. Water extraction means may also be located in the slip form itself.

The invention may further provide such an apparatus in which the water extraction means comprises an elongated tubular member of generally flattened oval shape in section, and having a plurality of small openings therein to admit water from said concrete.

More particularly, it is an objective of the invention to provide an apparatus having the foregoing advantages incorporating vibrating means, said water extraction means being connected thereto whereby the same may be vibrated within the concrete located in said hopper.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
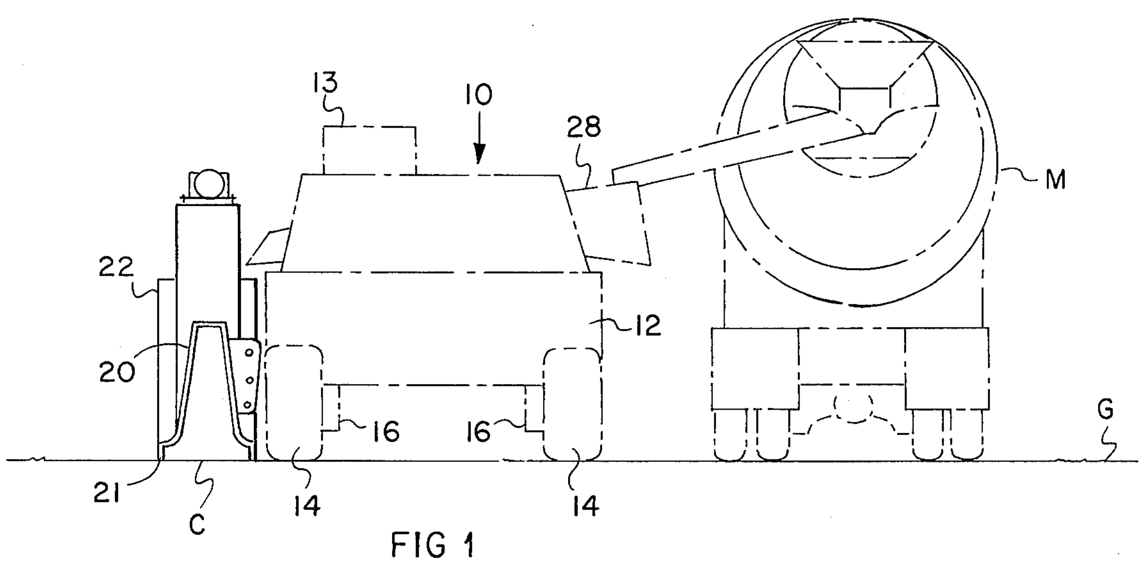
FIG. 1 is a schematic rear elevation.
Figure 2:
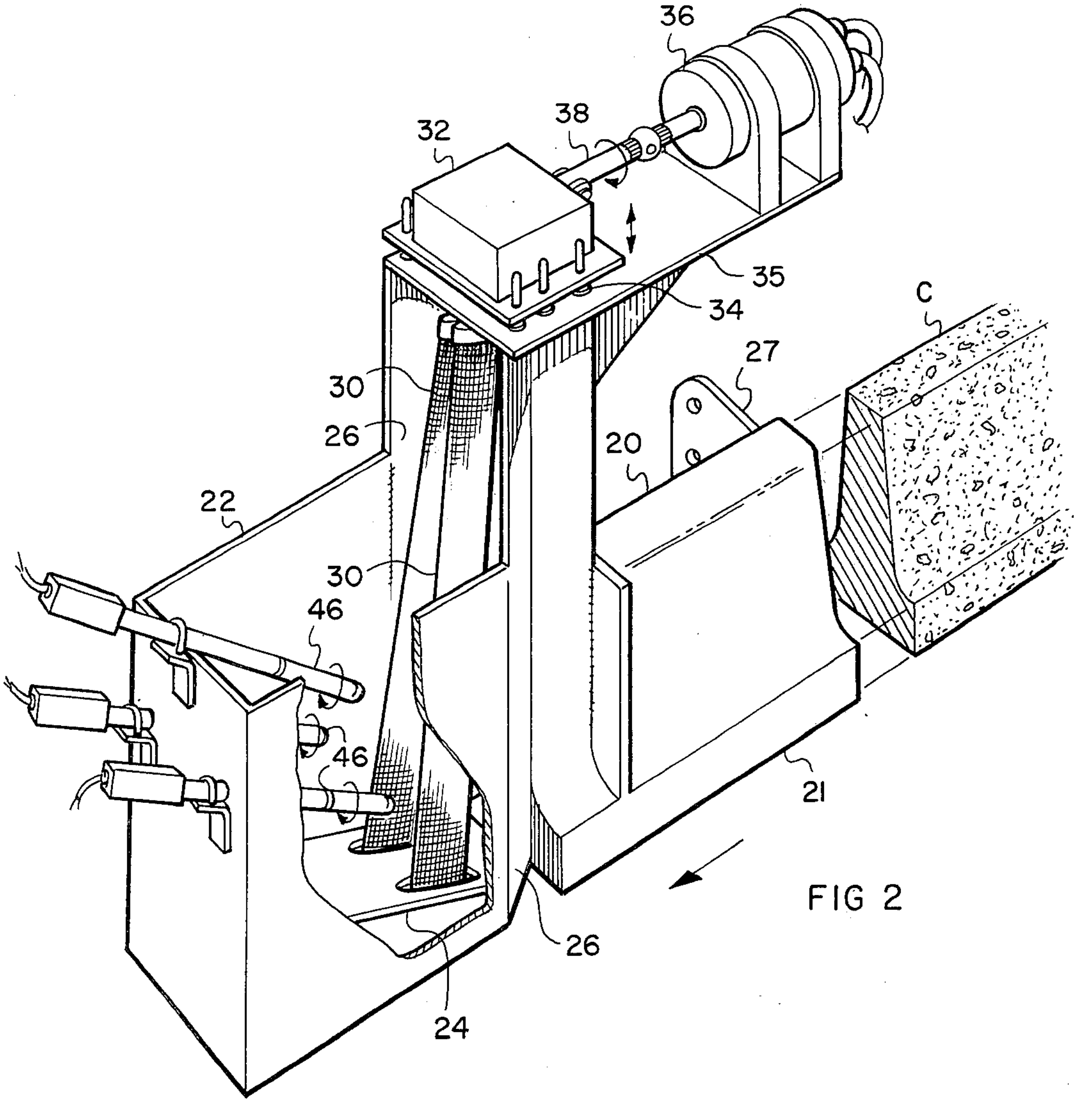
FIG. 2 is a cut-away perspective.
Figure 3:
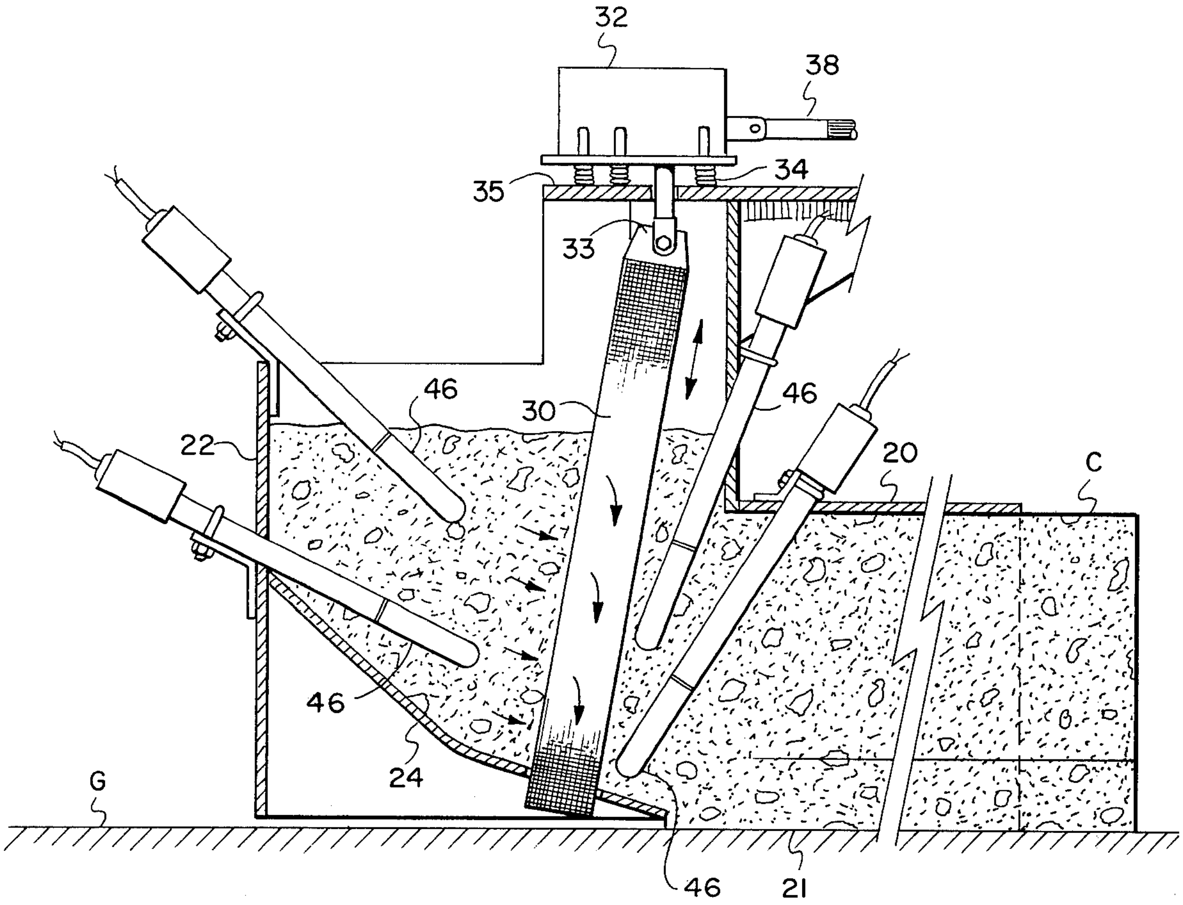
FIG. 3 is a section along line 3—3 of FIG. 2.
Figure 5:
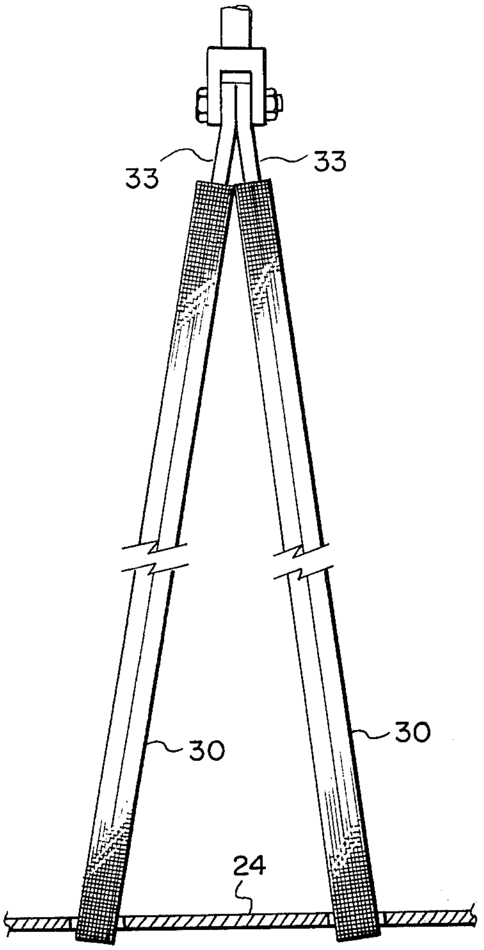

Referring now to FIG. 1, the invention will be seen to be illustrated in use in association with a typical mobile slip forming platform illustrated generally as 10. Such a slip forming platform is in fact a slow moving motorized vehicle, and comprises a body 12 having a driving position 13 with suitable controls, and having in this case four road wheels 14 mounted on adjustable suspension arms 16. Either one pair or, all four of the road wheels are driven by any suitable drive motor (not shown)

through any suitable form of suspension. A guidance mechanism is provided in this type of vehicle, for insuring that the vehicle travels slowly in precise conformity with a predetermined path along which concrete is to be laid.

In this type of vehicle, the body 12 is usually equipped with some form of lower adjustable attachment means (not shown) to which the appropriate concrete slip forms may be attached. Such slip forms may of course be attached at different locations depending upon the way in which the concrete is to be laid.

All of these features are essentially well known in the art at the present time. This type of equipment has been used for laying highway road beds, curbs, and the like having a relatively low profile and low height. In accordance with the invention the vehicle will incorporate a concrete hopper, and possibly some form of feed mechanism such as an auger feed or the like by means of which concrete may be loaded into the hopper for example from a truck, and then fed progressively into the slip form.

By means of the invention, slip forming of concrete can now be carried out, to provide concrete shapes having a greater height than was possible with known equipment.

The invention provides a slip form 20 having a cross-sectional shape providing for a relatively wide base B, having tapering shoulders S and an upstanding central wall portion W. This shape corresponds to the shape of the highway median barrier now in use, described above. It will of course be appreciated that this shape does not form part of the invention iteself, but is merely illustrated by way of illustrating the principles of the invention. The slip form 20 has an open bottom, and its lower edges 21 will be arranged and located so as to run as closely as possible to the surface of the substrate, typically the sub-surface of the road bed, or highway median. In order to feed concrete into the form 20, there is provided the supply hopper 22. The hopper 22 is essentially in the shape of an open topped vertical rectangular box having a sloping bottom wall 24, and having two forwardly tapering side walls 26 which are shaped to provide a restricted passageway, and are welded to form 20 thereby providing communication between the interior of the hopper 22 and the form 20. The form 20 and hopper 22 are attached along the side of the vehicle body 12 by any means eg. flanges 27 so that they move along the substrate in unison with the body 12. The height of the form 20 relative to the substrate is controlled by means of the adjustable suspension arm, and suitable height adjustment means incorporated in the vehicle 10, forming no part of this invention.

In order to deliver concrete to the hopper, any suitable delivery system may be provided. In this particular form of the invention, the delivery system shown is in the form of chute 28 mounted on the side of the platform or vehicle, and arrange so that concrete may be deposited for example from a ready-mix truck in the chute, and will then be delivered into the open upper end of the hopper.

In accordance with the invention, a portion of the water content of the concrete is extracted from the concrete in the hopper itself. This is achieved, in this form of the invention by the use of perforated tubular screen members 30. The screen members are in the form of an elongated tube, having a large number of small perforations therethrough whereby water may pass through, but the concrete is screened out to a large extent. Preferably, the tubular member 30 is provided with a section somewhat in the shape of an aircraft wing, that is to say of flattened elongated oval shape, being somewhat thicker at its front end, and tapering to a reduced thickness trailing end, whereby to facilitate flow of concrete therearound. Tubular members 30 are connected at their upper ends to a vibrator member 32 by plates 33. The vibrator member 32 is movably mounted on springs 34 and mounting bracket 35 attached in any suitable manner, eg. to a portion of the hopper. Any suitable motor means such as for example the hydraulic motor 36 may be coupled by shaft 38 to the vibrator 32, whereby operation of the motor will cause vibration of the vibrator, thereby procuring a high frequency vibration of the tubular members 30.

Within the interior of the tubular members 30, any necessary interior support means are provided such as cross bracer struts (not shown) or a perforated sheet metal wall member 40 which may extend from top to bottom of the tubular members 30, to prevent collapsing thereof, thereby permitting flow of water therealong.

Figure 4:
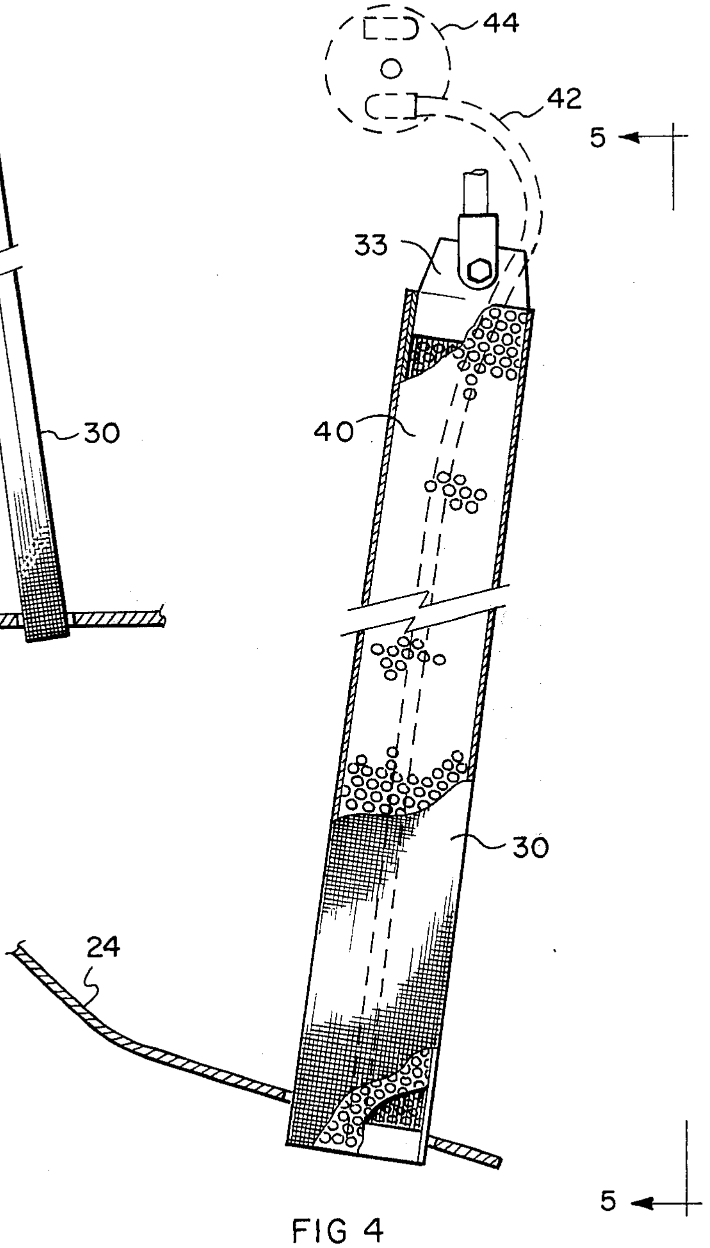
FIG. 4 is a side elevation of the water extraction means, and showing an alternate modification; and, FIG. 5 is a rear view of the water extraction means.

The lower end of the tubular members 30 will extend through the bottom wall 24 and are left completely open. They are suitably supported and located by the bottom wall 24 while being movable relative thereto to permit vibration of tubular member 30. Water and fines will flow directly out of such lower end onto the ground or substrate beneath bottom wall 24. Alternatively, the lower end of the tubular members 30 may be closed off, and the water may be removed by means of a suction pipe 42 and pump 44 extending down the interior of the tubular members 30, and depositing the water and fines extracted in some other location. Such a water removal pipe and pump are shown in phantom in FIG. 4.

In order to assist the flow of concrete down through the hopper and into the formwork, any suitable commercially available concrete vibrators indicated generally as 46 may be provided. These will typically be attached within the interior of the hopper 22, and/or the slip form 20 and will be operated by their own motor units in a manner well known in the art.

In operation, the platform or vehicle is located with the form work in the desired location over the substrate, and concrete is delivered to the chute and is continuously transferred into the hopper. The vibrator unit 32 for the tubular members 30 operates continuously. The hydrostatic pressure of the concrete within the hopper, together with the vibrating action of the tubular members, induces flow of water and fines from the concrete through the perforations, into the interior of the tubular members 30. The water is then removed either by flowing downwardly by gravity, or upwardly by a pumping action as described.

The quantities of water removed in this way may be relatively substantial. Typically, for example, when using low slump concrete approximately from 10 to 25 percent of the water content may be removed thereby greatly increasing its inherent stability as it emerges from the formwork and at the same time reducing the curing time required.

The partially dried and stabilised concrete passes through the formwork and emerges formed into the shape of the formwork, and is found to remain substantially stabilised in that shape during curing.

Preferably, the water removed in accordance with the process will be not less than about 10 percent, and should not be more than about 25 percent in the majority of cases. If the water extraction is too great, then a relatively substantial quantity of the cement content may also be leached out of the concrete, thereby substantially modifying or altering the strength of the cured product. However, these figures may of course be varied dependent upon the particular formulation of concrete as it is supplied.

The water extraction can be controlled by the frequency of vibration, and the duration of vibration. Thus all the vibrators 46 may be operated simultaneously, or one or more may be shut down. The speed of operation of the vibrator motor 36 and of vibrators 46 can also be regulated to regulate the vibration frequency.

Such adjustments must be made by the operator and will vary depending on the consistency of the concrete mix being supplied to the site.

The speed of forward movement of the vehicle itself can also be regulated, so as to submit the concrete to a greater or lesser time span in the hopper 22.

The foregoing is a description of the preferred embodiment of the invention which is given here by way of example only. The invention is not to be taken as limited to any of the specific features as described, but comprehends all such variations thereof as come within the scope of the appended claims.

I claim:

1. Apparatus for slip-forming of concrete, of the type having a carriage means movable along a substrate, formwork mounted on the carriage means, and a hopper for receiving concrete, communicating with said form means whereby said concrete may be placed in said hopper and will then pass to said form means, and wherein the improvement comprises water extraction means mounted within said hopper, and vibrator motor means for vibrating said water extraction means within said concrete in said hopper, whereby to extract water from concrete thereby stabilising the same.

2. Apparatus for slip-forming concrete as claimed in claim 1 including passageway means communicating between said hopper and said formwork, said passageway means being of a reduced width in relation to said hopper in said formwork whereby to squeeze said concrete as the same passes therebetween.

3. Apparatus for slip-forming concrete as claimed in claim 2 wherein said water extraction means is located adjacent to said passageway.

4. Apparatus for slip-forming concrete as claimed in claim 1 wherein said water extraction means includes at least one elongated tubular member located within said hopper, and the plurality of fine guage opening means in said tubular member whereby water may enter said tubular member, and means for removing water within said tubular member.

5. Apparatus for slip-forming concrete as claimed in claim 4 wherein said tubular member extends through the bottom of said hopper, and is provided with an open end whereby water entering said tubular member from said concrete may flow downwardly therein and pass therefrom beneath said hopper under the influence of gravity.

6. Apparatus for slip-forming concrete as claimed in claim 4 wherein said tubular member is closed at its lower end, and including conduit means within said tubular member extending to above the lower end thereof, and pump means connected with said conduit means for extracting water from said tubular member.

7. Apparatus for slip-forming concrete as claimed in claim 4 including a pair of said tubular members, located adjacent to one another and angled relative to one another, being closer together at their upper ends and wider apart at their lower ends, and including linkage means extending upwardly from their upper ends, vibrator means connected to said linkage means, and power operated drive means for driving said vibrator means.

8. Apparatus for slip-forming concrete as claimed in claim 1 including bottom wall means enclosing the bottom end of said hopper, and opening means therethrough, said water extraction means extending through said opening means.

* * * * *